US009098843B2

(12) United States Patent
Fuerstenberg et al.

(10) Patent No.: US 9,098,843 B2
(45) Date of Patent: Aug. 4, 2015

(54) SYSTEM AND METHOD FOR TEMPORARILY ENABLING PROPRIETARY TRANSIT PAYMENTS ON A HOTEL ROOM KEY (75) Inventors: Zack Fuerstenberg, Toronto (CA); Oleg Makhotin, Mississauga (CA); William Alexander Thaw, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 429 days.

(21) Appl. No.: 12/944,057

(22) Filed: Nov. 11, 2010

(65) Prior Publication Data

US 2011/0166995 A1 Jul. 7, 2011

Related U.S. Application Data (60) Provisional application No. 61/292,766, filed on Jan. 6, 2010.

(51) Int. Cl.
*G06Q 20/20* (2012.01)
*G06Q 20/28* (2012.01)
*G06Q 10/10* (2012.01)
*G06Q 20/10* (2012.01)
*G07F 17/00* (2006.01)

(52) U.S. Cl.
CPC ............... *G06Q 20/28* (2013.01); *G06Q 10/10* (2013.01); *G06Q 20/102* (2013.01); *G07F 17/0014* (2013.01)

(58) Field of Classification Search
None
See application file for complete search history.

(56) References Cited

U.S. PATENT DOCUMENTS

| 5,530,232 | A | * | 6/1996 | Taylor | 235/380 |
| 5,999,624 | A | * | 12/1999 | Hopkins | 705/70 |
| 6,101,477 | A | * | 8/2000 | Hohle et al. | 705/5 |
| 6,595,416 | B1 | | 7/2003 | Newsome et al. | |

(Continued)

FOREIGN PATENT DOCUMENTS

WO    WO 95/16245    *  6/1995    ......... G06K 19/067

OTHER PUBLICATIONS

Sanchez, Rene "Vegas's [sic] Next High Roller: a Monorail; Western Cities Look at Mass Transit as Road Gridlock Worsens," The Washington Post, Apr. 23, 2002.*

(Continued)

*Primary Examiner* — Robert R Niquette
(74) *Attorney, Agent, or Firm* — Kilpatrick Townsend & Stockton LLP (57) ABSTRACT One embodiment of the invention is directed to a system comprising a database and a server computer coupled to the database, wherein the server computer comprises a processor and a computer-readable storage medium coupled to the processor, the computer readable storage medium comprising code executable by the processor for implementing a method comprising: receiving transit transaction data, determining a hotel based on the transit transaction data, and sending the transit transaction data to the hotel, wherein the hotel places a transit charge based on the transit transaction data onto a hotel folio. Another embodiment of the invention is directed to a method, the method comprising receiving transit transaction data, determining a hotel based on the transit transaction data, and sending the transit transaction data to the hotel, wherein the hotel places a transit charge based on the transit transaction data onto a hotel folio.

20 Claims, 6 Drawing Sheets

(56) References Cited

U.S. PATENT DOCUMENTS

| | | | |
|---|---|---|---|
| 699,936 | A1 | 2/2006 | Sehr |
| 7,213,766 | B2 | 5/2007 | Ryan et al. |
| 7,347,368 | B1* | 3/2008 | Gravelle et al. ............... 235/384 |
| 7,374,082 | B2* | 5/2008 | Van de Velde et al. ....... 235/380 |
| 7,451,921 | B2 | 11/2008 | Dowling et al. |
| 2002/0040936 | A1 | 4/2002 | Wentker et al. |
| 2002/0198835 | A1* | 12/2002 | Watson ........................... 705/40 |
| 2003/0195842 | A1 | 10/2003 | Reece |
| 2004/0215560 | A1* | 10/2004 | Amalraj et al. ................. 705/40 |
| 2005/0038741 | A1* | 2/2005 | Bonalle et al. .................. 705/40 |
| 2005/0171898 | A1 | 8/2005 | Bishop et al. |
| 2006/0004602 | A1* | 1/2006 | Silverbrook et al. ............. 705/1 |
| 2006/0074799 | A1* | 4/2006 | Averyt et al. ................... 705/40 |
| 2006/0229985 | A1* | 10/2006 | Lalwani et al. ................. 705/41 |
| 2007/0162382 | A1* | 7/2007 | Lesniak .......................... 705/39 |
| 2007/0168287 | A1* | 7/2007 | McCarthy et al. .............. 705/51 |
| 2008/0249847 | A1* | 10/2008 | Dahlin ............................ 705/14 |
| 2008/0319869 | A1* | 12/2008 | Carlson et al. ................. 705/26 |
| 2009/0063333 | A1* | 3/2009 | Nambiar et al. ................ 705/39 |
| 2009/0138394 | A1* | 5/2009 | Garrison et al. ................ 705/35 |
| 2012/0109722 | A1* | 5/2012 | Saunders et al. ............... 705/13 |

OTHER PUBLICATIONS

Schnabel, P. "A New High-security, Multi-application Smart Card Jointly Developed by Bull and Philips." Smart Card 2000, selected papers from the Second International Smart Card 2000 Conference (Oct. 4-6, 1989). North-Holland, 1991, pp. 9-15.*

* cited by examiner

Hotel Folio
New York, NY

Folio Number: L5A-23
Room Number: 343
No of Guests: 1

| Date | Description | Charges |
| --- | --- | --- |
| August 8, 2010 | Room Charge | 80.00 |
| August 8, 2010 | Room Service | 25.00 |
| August 8, 2010 | Subway Fare | 3.00 |
| August 9, 2010 | Bus Fare | 2.25 |
| August 9, 2010 | Hotel Breakfast Buffet | 15.00 |
| August 9, 2010 | In Room Movie | 8.95 |
| August 9, 2010 | Subway Fare | 2.00 |
| August 9, 2010 | Subway Fare | 2.00 |

SYSTEM AND METHOD FOR TEMPORARILY ENABLING PROPRIETARY TRANSIT PAYMENTS ON A HOTEL ROOM KEY

CROSS-REFERENCES TO RELATED APPLICATIONS

This application claims benefit under 35 U.S.C. §119(e) of U.S. provisional patent application No. 61/292,766, entitled "System and Method for Temporarily Enabling Proprietary Transit Payments on a Hotel Key," filed on Jan. 6, 2010, the entire disclosure of which is incorporated herein by reference for all purposes.

BACKGROUND

Many people regularly use transit systems to commute to work and/or to travel for a variety of purposes. In an effort to improve the convenience of transit travel, many transit operators now offer riders the option of paying for trips through using fare media cards with embedded proprietary contactless payment applications.

While such fare media cards are convenient for regular riders, the cards present several problems for out-of-town visitors. For example, out-of-town visitors often must spend significant time, effort, and money simply learning how to purchase fare media cards. Out-of-town visitors are also frequently deterred from using fare media cards because many transit operators require each card to be preloaded with a minimum amount. Illustratively, a transit operator may require a rider to prepay fifteen dollars before issuing a fare media card. If, however, an out-of-town visitor only requires five dollars worth of trips, he or she may choose not to purchase a fare media card, and may therefore not use the associated transit system.

What is needed is a system that can remove barriers to transit use for out-of-town visitors. It would further be desirable to make paying for transit fare more convenient by consolidating transit and non-transit charges onto a single folio or bill. Embodiments of the present invention address these problems and other problems individually and collectively.

BRIEF SUMMARY

Embodiments of the present invention can relate to systems and methods for processing a transit transaction and sending transit transaction data to a hotel so that a transit charge may be included on a hotel customer's folio or bill. In some embodiments, the processing of transit transactions and sending of transit transaction data may be accomplished through specialized processing, linking, and aliasing capabilities. In certain embodiments, a hotel customer may perform a transit transaction (e.g., purchasing transit fare) by using a proprietary contactless payment application embedded in or on a hotel assigned portable device. For example, a hotel customer may present a hotel assigned portable device (e.g., a hotel room key card) to a first access control device situated at the entrance of a local subway system. The first access control device may determine that the portable device is valid and allow the customer to access the subway system. At the conclusion of his or her trip, the hotel customer may present his or her assigned portable device to a second access control device situated at an exit of the subway system. The second access control device may determine that the portable device is valid and allow the customer to exit the subway system. In some embodiments, a transit fare amount may also be calculated for the customer's trip. Transit transaction data for the trip, which includes the calculated fare amount, may then be sent to a processing engine. Upon receiving the transit transaction data, the processing engine may determine a hotel based on the transit transaction data. The processing engine may subsequently send the transit transaction data (or a portion of the transit transaction data) to the hotel associated with the portable device. Upon receiving the data from the processing engine, the hotel may place a transit charge onto the hotel customer's bill or folio.

One embodiment of the invention is directed to a system comprising a processor, and a computer-readable medium coupled to the processor, the computer readable medium comprising code executable by the processor for implementing a method comprising receiving transit transaction data, determining a hotel based on the transit transaction data, and sending the transit transaction data to the hotel, wherein the hotel places a transit charge based on the transit transaction data onto a hotel folio.

Another embodiment of the invention is directed to a method, the method comprising receiving transit transaction data, determining a hotel based on the transit transaction data, and sending the transit transaction data to the hotel, wherein the hotel places a transit charge based on the transit transaction data onto a hotel folio.

These and other embodiments of the invention are described in further detail below.

DETAILED DESCRIPTION

One embodiment of the present invention is directed to a method. In the method, a hotel, via a hotel management system, temporarily activates a payment application embedded in or on a portable device assigned to a customer. A portable device may be any suitable device, such as a room key card, payment card, payroll card, security card, access card, smart media, transponder, cellular phone, personal digital assistant, tablet device, pager, access device, key fob, and the like. During activation, the portable device may be preloaded with a stored value. The stored value may represent a preloaded monetary amount or number of transit trips. The portable device may further include a maximum per period value. Upon activation of the payment application, a customer may use the portable device to purchase a transit fare from a transit system during his or her hotel stay. More specifically, a customer may present his or her assigned portable device to a first access control device situated at an entrance of the transit system. By presenting the portable device to the first access control device, the customer may cause a first data transfer to be initiated. In particular, data may be communicated from the portable device to the first access control device. Upon receiving the data from the portable device, the first access control device may validate the portable device. For example, the first access control device may determine whether the portable device is on a transit system blacklist. The first access control device may also determine if the portable device contains a sufficient amount of funds or number of rides. The first access control device may further determine if the portable device has been used to purchase fare or a number of rides that exceeds a maximum per period value. Upon a successful validation, the first access control device allows the customer to enter the transit system. After finishing his or her trip, the customer presents the portable device to a second access control device situated at an exit of the transit system. By presenting the portable device to the second access control device, the customer may cause a second data transfer to be initiated. In particular, data may be communicated from the portable device to the second access control device. Upon receiving the data from the portable device, the second access control device may perform a second validation. Upon a successful validation, the second access control device allows the customer to exit the transit system. A transit fare may additionally be determined for the customer's trip. Transit transaction data, including the transit fare amount, may be then sent to a processing engine. The processing engine processes the transit transaction data to determine a hotel associated with the portable device. The processing engine subsequently sends the transit transaction data (or portion of the transit transaction data) to the hotel associated with the portable device. Upon receiving the transit transaction data, the hotel places a transit charge onto the customer's folio. Finally, at check-out or at some later time, the customer settles his or her folio with the hotel.

Embodiments of the present invention provide several advantages. First, embodiments permit various proprietary systems to communicate with one another. In particular, hotel management systems and transit systems are often proprietary and do not have the ability to interact with one another. Embodiments can include various application programming interfaces (APIs) that can be utilized to facilitate communication between various systems.

Embodiments of the present invention additionally provide benefits to hotel customers, hotels, and transit operators. For instance, hotel customers receive the convenience of being able to utilize local transit for the duration of their stay without having to waste time, effort, or money trying to learn how to purchase fare media cards. Additionally, hotel customers benefit by having many of their transit related questions answered by hotel personnel. In particular, hotel customers are frequently from other countries and may not speak the local language. Embodiments of the invention enable hotel clerks and concierge, who are often fluent in a hotel customer's home-country language, to explain local transit systems. Embodiments also enable customers to use transit systems without having to prepay a certain minimum amount. As discussed, many transit operators require that riders purchase prepaid fare media cards loaded with a minimum number of rides or fare. In many cases, the minimum number of rides or fare exceeds the number of rides or fare that a hotel customer actually needs. Because embodiments do not require hotel customers to prepay a minimum amount, transit usage by hotel customers may become more likely. Lastly, embodiments permit hotel customers to conveniently pay for their transit and hotel related charges on a single folio or bill. By making it more convenient to pay for transit, embodiments further promote transit usage among out-of-town visitors.

Embodiments of the present invention also provide advantages to hotels. In particular, hotels benefit through being able to provide an added value service and convenience to their customers. Additionally, embodiments enable hotels to earn commission from local transit operators for providing portable devices with payment applications to their customers. Hotels may also add a surcharge on a customer's hotel folio for the added convenience.

Likewise, transit operators may benefit by increasing their potential ridership from out-of-town visitors. Such an increase may improve sales and asset utilization. Embodiments are particularly beneficial in the case of tourists, who often ride at "off peak" times outside of rush hour. During these off peak times, transit assets are normally under-utilized. Transit operators also benefit from not needing to provision customer service to out-of-town visitors. Provisioning such services may be difficult and expensive—particularly where out-of-town visitors do not speak the local language. Finally, transit operators do not need to furnish out-of-town visitors with credentials or transit application fare media. For local transit operators, furnishing such fare media to temporary riders is often not financially viable.

While embodiments described herein are directed to hotels and transit systems, it should be appreciated that one of ordinary skill in the art could modify the invention to be directed to non-hotel and non-transit system contexts. Other contexts may include, for example, museums, amusement parks, concerts, plays, historical venues, and the like. For instance, embodiments of the invention may be modified, without departing from the spirit and scope of the invention, to enable museum admission charges to be placed onto a single hotel bill. As another example, embodiments of the invention may be modified, without departing from the spirit and scope of the invention, to enable amusement park admission charges to be placed onto a travel concierge services bill.

Exemplary systems and methods are described in further detail below.

I. Exemplary Systems

Figure 1:
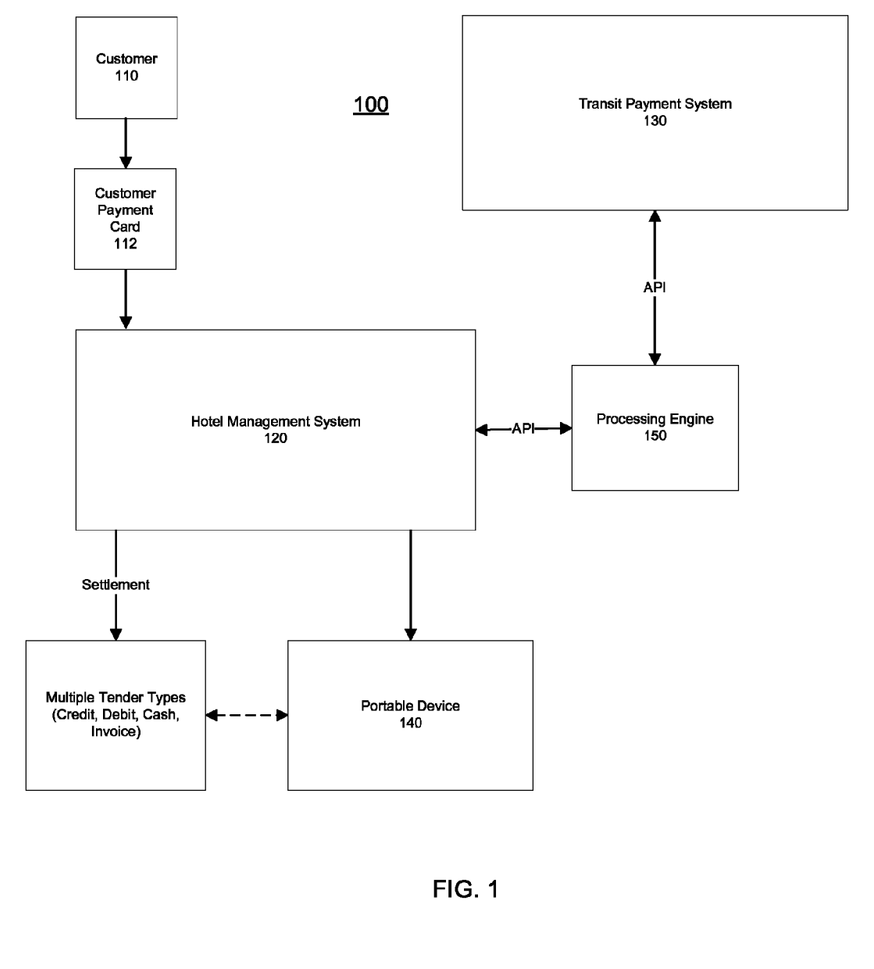
FIG. 1 is a functional block diagram illustrating the primary functional elements of an exemplary portable device payment processing system, in accordance with embodiments of the present invention.

FIG. 1 is a diagram illustrating a portable device payment processing system 100. The portable device payment processing system 100 includes a customer 110, a customer payment card 112, a hotel management system 120, a transit payment system 130, a portable device 140, and a processing engine 150.

Although one customer 110, one customer payment card 112, one hotel management system 120, one transit payment system 130, one portable device 140, and one processing engine 150 are shown, there may be any suitable number of any of these entities in the portable device payment processing system 100.

The above-described components can be in operative communication with each other, and/or may be operatively coupled to each other in any suitable manner. The transit payment system 130 and the hotel management system 120 can communicate through processing engine 150. In certain embodiments, the various entities shown in FIG. 1 may communicate through any suitable communication medium including networks such as the Internet.

Customer 110 can refer to a hotel guest and/or a transit system patron. The customer 110 can also refer to a patron of other service providers, such as a museum or amusement park.

Customer payment card 112 can refer to a credit card, debit card, or prepaid card provided to the customer 110 by an issuer. In other embodiments, the customer payment card 112 could alternatively be in a different form such as a phone or key fob.

Portable device 140 can refer to any suitable device for communicating with an access control device. The portable device 140 can be hand-held and compact so that it can fit into a user's wallet and/or pocket (e.g., pocket-sized). Examples of the portable device 140 can include room key cards, payment cards, payroll cards, security cards, access cards, smart media, transponders, cellular phones, personal digital assistants, tablet devices, pagers, access devices, key fobs, and the like. The portable device 140 may interface with an access control device using any suitable mechanism including any suitable electrical, magnetic, or optical interfacing system. For example, portable device 140 may include a physical interface (such as a magnetic stripe or set of contacts) that enables communication with a magnetic stripe reader of an access control device. Specifically, in order for the portable device 140 to communicate with such an access control device, the physical interface of the portable device 140 must directly contact the magnetic stripe reader of the access control device. As a second example, the portable device 140 may communicate with an access control device via a contactless element. More specifically, communication may occur between the portable device 140 and the access control device by placing the portable device in proximity to the access control device. Communication may be facilitated using near field or any similar short range communications technology. Near field communications technology may include ISO standard 14443, Bluetooth™, RFID or other radio frequency (RF) technologies.

In certain embodiments, the portable device 140 may include both a physical interface for communicating with an access control device via direct contact and a contactless element for communicating with an access control device without the need for direct contact. For example, the portable device 140 may include a magnetic stripe for direct contact communication with an access control device situated on or near the entrance of a hotel room. The portable device 140 may additionally include a contactless element for communicating using RF technology. Illustratively, the portable device 140 may include a contactless element for communicating with an access control device situated at the entrance of a transit system. In some embodiments, the portable device 140 may include either only one type of interface (e.g., either a physical interface or contactless element).

In some embodiments, the portable device 140 may include any suitable volatile and/or non-volatile memory to store data such as hotel data, transit data, customer data, application data, portable device data, and the like.

In some embodiments, the portable device 140 may include a microprocessor. The microprocessor may perform certain functions, such as changing, updating, resetting, or otherwise manipulating data stored in the portable device's 140 memory.

In certain embodiments, the portable device 140 may include multiple applications capable of performing one or more functions. For example, the portable device 140 may include a hotel room key application for opening a hotel room. The portable device 140 may additionally include a payment application for use with a transit system. As another example, the portable device 140 may include two different payment applications for use with two different transit systems. In certain embodiments, an application may be any suitable computer program. In some embodiments, the various applications may be proprietary and not capable of communicating with one another. In certain embodiments, an application may use a communications interface and any suitable data for performing an application function. For example, a payment application may use a contactless element for interfacing with a transit payment system. The payment application may further include identification data for use in purchasing transit fare. In some embodiments, different applications may share the same communications interface. The data for each application, however, may be separated from the data of other applications.

Figure 2:
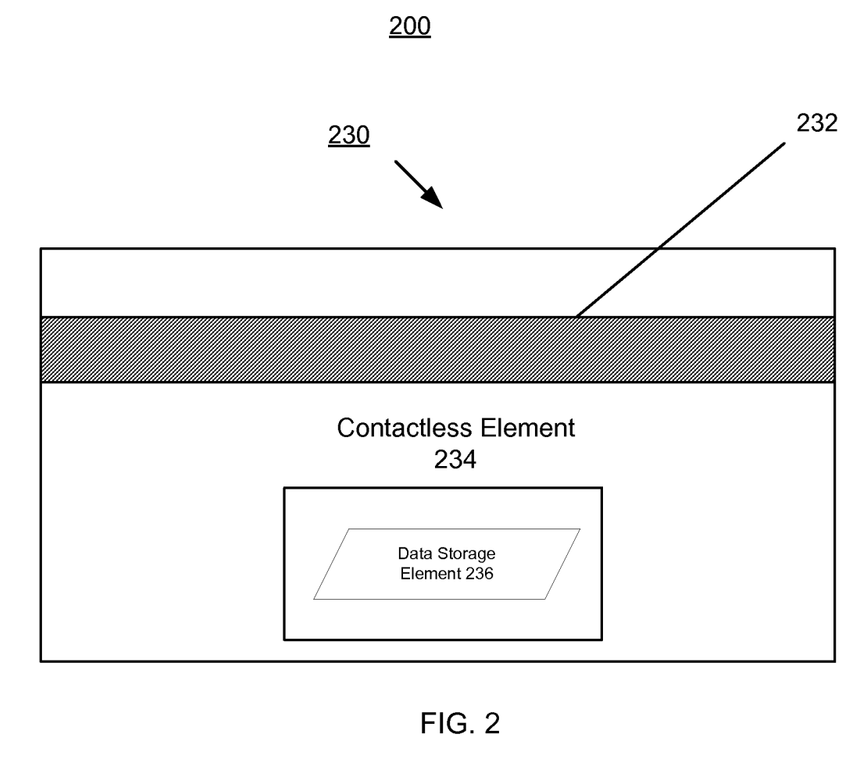
FIG. 2 is a diagram of an exemplary portable device, in accordance with embodiments of the present invention.

FIG. 2 shows an exemplary portable device 200, which is in the form of a card. The portable device 200 can include a plastic substrate 230. The portable device 200 may further include a contactless element 234 for interfacing with access control devices using near field or any similar short range communications technology. The contactless element 234 may be embedded in or on the plastic substrate 230. In some embodiments, the contactless element 234 may be implemented in the form of a data storage element 236 with an associated wireless data transfer (e.g., data transmission) element (not shown), such as an antenna. In some embodiments, the data storage element 236 may be a semiconductor chip. The data storage element 236 may include a computer readable medium for storing hotel data, transit data, customer data, application data, portable device data, and the like. For example, the data storage element 236 may store a unique portable device identifier and a stored value representing a number of remaining transit trips.

The portable device 200 may additionally include a magnetic stripe 232 for physically interfacing with access control devices. The magnetic stripe 232 may be embedded in or on the plastic substrate 230. The exemplary portable device 200 may also comprise a microprocessor (not shown) coupled to a data storage element 236.

Hotel management system 120 can refer to any suitable entity or entities that can manage hotel reservations, portable devices, and hotel folios. In some embodiments, the hotel management system 120 may include a hotel reservation module, a customer hotel bill management module, and a room key card management module (each not shown). Hotel management system 120 may further include a hotel management server computer (not shown). The hotel management server computer may be a powerful computer or cluster of computers. For example, the hotel management server computer can be a large mainframe, a minicomputer cluster, or a group of servers functioning as a unit. In one example, the server computer may be a database server coupled to a web server. The hotel management server computer may be configured to temporarily activate portable devices. For example, the hotel management server computer may activate the portable device 140 to allow the portable device to perform transit fare purchases. The hotel management server computer may further be configured to cancel or reconfigure portable devices for new customers. For instance, when a customer checks out, a hotel may reassign the portable device 140 to another customer. The hotel management server computer may further receive data from the processing engine 150, and place associated transit charges onto the hotel folio or bill of a customer.

Processing engine 150 can refer to any suitable entity or entities that can track and manage the linkage and activation of portable devices. The processing engine 150 can further refer to any suitable entity or entities that can receive transit transaction data, process transit transaction data and transmit the transaction data (or a portion of the transaction data) to a hotel. In some embodiments, the processing engine 150 may manage interfaces to a multitude of different hotel management and transit payment systems. The processing engine 150 may further be configured to process transit transactions in a variety of currencies and transit payment schemes. The processing engine 150 may further be configured to govern any charges and commissions related to a transit transaction. The processing engine 150 may additionally be configured to track and reconcile any fee income generated in order to facilitate billing and reporting functions.

In some embodiments, the processing engine 150 may have or operate a server computer and may include a database.

In some embodiments, the processing engine 150 may be hosted within a payment processing network. As used herein, a "payment processing network" can refer to a network of suitable entities that support and deliver authorization services, exception file services, and clearing and settlement services for transactions. An exemplary payment processing network may include VisaNet™. Payment processing networks, such as VisaNet™, are able to process credit card transactions, debit card transactions, prepaid card transactions, and other types of commercial transactions. VisaNet™, in particular, includes a VIP system (Visa Integrated Payments system), which processes authorization requests. VisaNet™ further includes a Base II system, which performs clearing and settlement services.

Transit payment system 130 can refer to any suitable entity or entities that process transit transactions for and control access to a transit system. Transit transactions may include, for example, the purchase of transit fare. Transit systems may include, for example, subway systems, train systems, ferry systems, bus systems, and the like. In some embodiments, the transit payment system 130 may be a transit proprietary closed loop clearing system. The transit payment system 130 may include a transit server computer and one or more access control devices.

Figure 3:
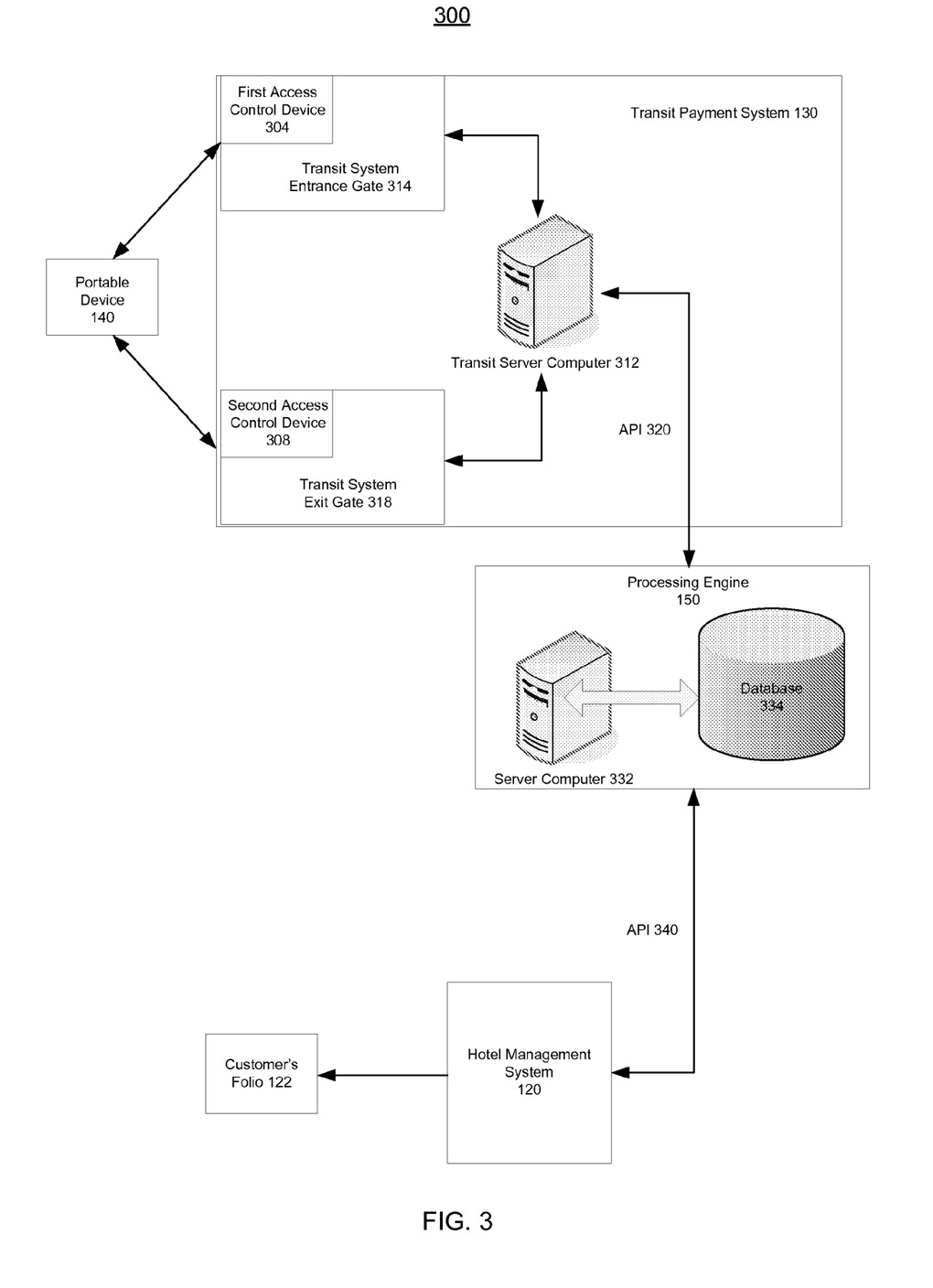
FIG. 3 is a functional block diagram illustrating a subsystem of an exemplary portable device payment processing system, in accordance with embodiments of the present invention.

FIG. 3 is a diagram illustrating a subsystem 300 of the portable device payment processing system 100. FIG. 3 illustrates more details about the transit payment system 130 and the processing engine 150.

In certain embodiments, transit payment system 130 may include the access control devices 304 and 308, and the transit server computer 312.

Access control devices 304 and 308 can refer to any suitable devices that control access to a transit system. In some embodiments, the access control devices 304 and 308 may be situated, respectively, at an entrance gate 314 and an exit gate 318 of a transit system. In certain embodiments, first access control device 304 may validate the portable device 140 prior to allowing a customer to enter the transit system. In some embodiments, second access control device 308 may validate the portable device 140 prior to allowing a customer to exit the transit system. Access control devices 304 and 308 may each include a portable device reader, a processor, and a computer-readable medium. The portable device reader may include any suitable contact or contactless mode of operation. For example, in some embodiments, each of the access control devices 304 and 308 may include a magnetic stripe reader to read a magnetic stripe on the portable device 140. In another example, each of the access control devices 304 and 308 may include a contactless portable device reader with a radio frequency (RF) antenna for communicating with the portable device 140 using RF technology (e.g., RFID).

Transit server computer 312 can refer to a powerful computer or cluster of computers. For example, the transit server computer 312 can be a large mainframe, a minicomputer cluster, or a group of servers functioning as a unit. In one example, the transit server computer 312 may be a database server coupled to a web server. The transit server computer 312 can include a computer-readable medium (CRM) and a processor (both not shown) coupled to the CRM.

In certain embodiments, processing engine 150 may include the server computer 332, the database 334, and the application programming interfaces 320 and 340.

Server computer 332 can refer to a powerful computer or cluster of computers. For example, the server computer 332 can be a large mainframe, a minicomputer cluster, or a group of servers functioning as a unit. In one example, the server computer 332 may be a database server coupled to a web server. The server computer 332 includes a computer-readable medium (CRM) and a processor coupled to the CRM (both not shown).

Database 334 can refer to one or more server computers for storage of data. It can also refer to one or more electronic storage units (e.g., stand alone hard drives) capable of storing electronic data.

Application programming interface (API) 320 can refer to an interface that facilitates communication between a transit payment system and a processing engine. The application programming interface 320 may include suitable specifications for communication protocols, routines, and data structures.

Application programming interface (API) 340 can refer to an interface that facilitates communication between a hotel management system and a processing engine. The application programming interface 340 may include suitable specifications for communication protocols, routines, and data structures.

II. Method

Figure 4:
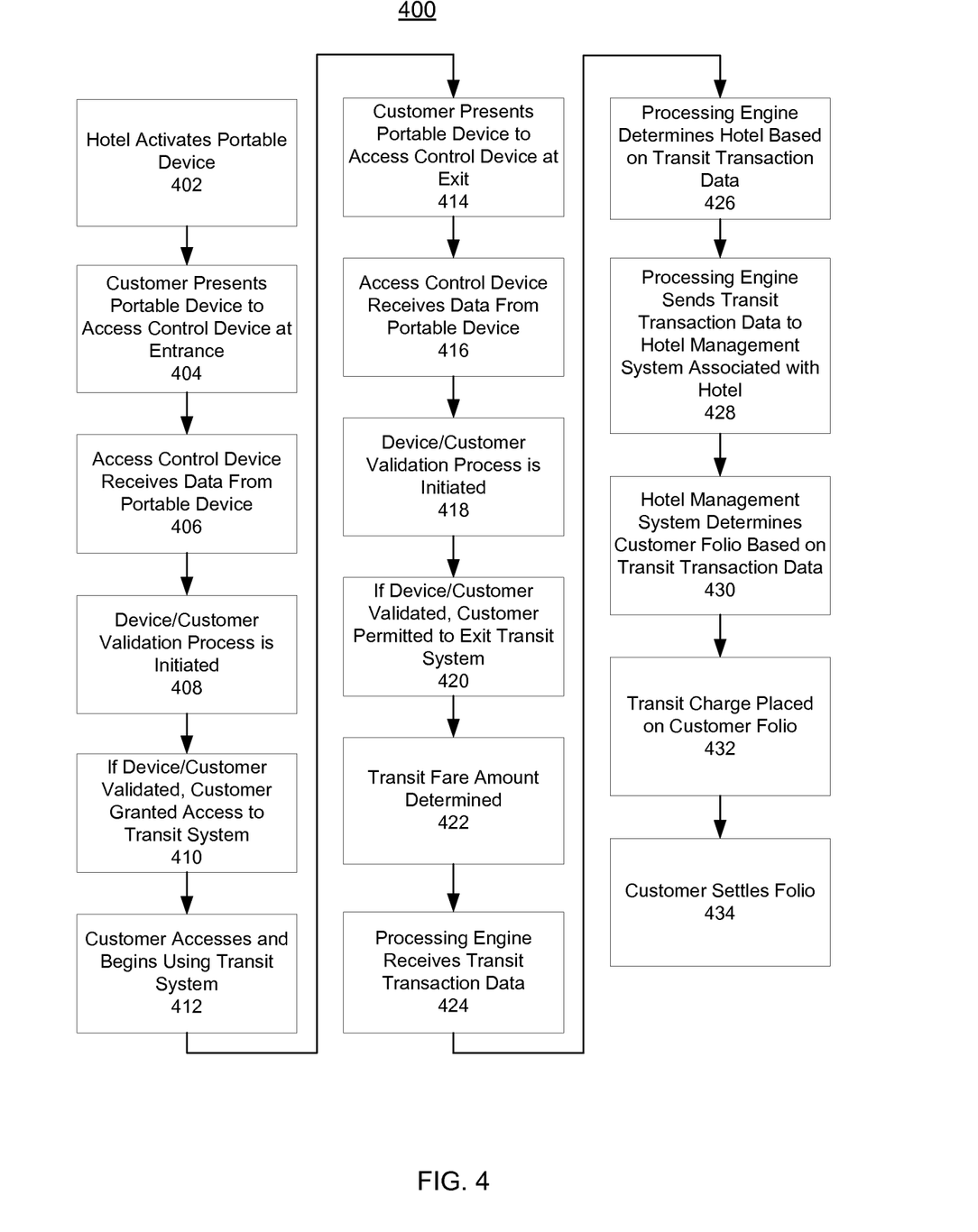
FIG. 4 is a flowchart illustrating a process for activating a portable device, purchasing transit fare, processing transit transaction data and placing a transit charge onto a hotel folio, in accordance with embodiments of the present invention.

FIG. 4 is a flowchart illustrating a process for activating a portable device, processing a transit transaction initiated by the portable device, sending transit transaction data to a hotel associated with the portable device, and placing an associated transit charge on a hotel folio or bill.

As shown in FIG. 4, the hotel activates the portable device 140 using hotel management system 120 (step 402). Next, the customer 110 presents the portable device 140 to the first access control device 304, which is situated at an entrance of a transit system (step 404). Upon being presented with the portable device 140, the first access control device 304 receives data from the portable device 140 via a first data transfer (step 406). The received data is used to validate the portable device 140 and/or the customer 110 (step 408). If the portable device 140 and/or the customer 110 are validated, the customer 110 is granted access to the transit system, and may begin using the system (steps 410 and 412). After customer 110 finishes using the transit system, he or she exits the system by presenting the portable device 140 to the second access control device 308, which is situated at an exit of the transit system (step 414). Data is received from the portable device 140 via a second data transfer and a second validation process is initiated (steps 416 and 418). If the portable device 140 and/or the customer 110 are validated, the customer 110 is permitted to exit the transit system (step 420). A transit fare amount for the customer's 110 transit trip is additionally determined (step 422). After the transit fare amount is determined, transit transaction data is sent to the processing engine 150. Upon receiving the transit transaction data (step 424), the processing engine 150 determines a hotel associated with the portable device 140 based on the transit transaction data (step 426). Next, the processing engine 150 sends the transit transaction data (or a portion of the transit transaction data) to a hotel management system (i.e. the hotel management system 120) associated with the hotel (step 428). Upon receiving the data from the processing engine 150, the hotel management system 120 determines a customer's folio (i.e. customer's folio 122) based on the received data (step 430). A transit charge is then placed on the customer's 110 hotel folio 122 (step 432). Finally, the customer 110 settles the charges on the customer's folio 122, which may include both transit and hotel related charges (step 434).

Embodiments can include any suitable combination of the steps discussed or shown in FIG. 4. For example, some embodiments can be directed to a method including steps 426, 428, 432, and 434 without the other illustrated steps."

A. Portable Device Activation

Typically, the customer 110 begins by checking in at a hotel. As part of the check-in process, the hotel, via hotel management system 120, provisions the portable device 140 so that the device can be used to access a hotel room assigned to the customer 110. The portable device 140 may be, for example, a hotel room key card. During the provisioning process, a processor (which executes code on a computer readable medium) in the hotel management system 120 may provision the portable device 140 in any suitable manner. For example, the portable device 140 may include a magnetic stripe. The hotel management system 120 may encode information onto the magnetic stripe so that the customer 110 can enter his or her assigned hotel room by swiping the portable device 140 at an access control device near or attached to his or her hotel room door. In other embodiments, the hotel management system may simply store hotel room access information on a server computer, without encoding new information on the portable device 140. In such embodiments, the server computer may simply indicate that a particular portable device identifier (e.g., number) is granted access to a particular room in the hotel, and the access control device (e.g., lock) to that room may be correspondingly notified or changed, without writing new information to the portable device 140.

During check-in or at a later time, the customer 110 may additionally indicate that he or she wishes to use the portable device 140 to purchase transit fare for a transit system associated with the transit payment system 130. In some embodiments, the hotel, via hotel management system 120, may subsequently activate the portable device 140 so that the device can be used to purchase transit fare from the transit payment system 130 (step 402 of FIG. 4). Activation of the portable device 140 may include activating a payment application embedded in or on the portable device 140. The payment application may be configured for use with the transit payment system 130. For example, a room key card issued at a London hotel may include a proprietary contactless payment application for use with the Transport for London's proprietary transit payment system.

In some embodiments, as part of activation, the customer 110 may additionally provide the customer payment card 112 to the hotel to cover any transit charges that are incurred during the customer's 110 stay. The customer payment card 112 may be, for example, a credit, debit, or prepaid card.

In certain embodiments, the hotel initiates a preauthorization process to place a hold on an account associated with the customer payment card 112. The hold may be in an amount for the estimated transit charges that the customer 110 might incur during his or her hotel stay. In certain embodiments, the preauthorization hold amount may be determined based on various factors including the transit system type (e.g., subway, ferry, bus, etc.), customer type (tourist, business, etc.), the amount the customer 110 incurred during previous hotel stays, standard operating procedures for the hotel, and the like. In certain embodiments, the preauthorization hold amount may include other estimated charges. For example, the preauthorization hold amount may include an estimate for the customer's 110 total incidental charges.

The preauthorization process may include sending a preauthorization request. For example, a preauthorization request message including the hold amount may be sent to an issuer of the payment card 112 at a POS terminal operated by the hotel, and a response to that preauthorization request message may be received at the POS terminal operated by the hotel. In such cases, the preauthorization request message may contain information that is in a typical payment card authorization request message, such as an expiration date for the payment card, a CVV or card verification value, an account number including a bank identification number, a service code, and a merchant category code.

In certain embodiments, the hotel, via the hotel management system 120, may set an initial stored value for the payment application embedded in or on the portable device 140. In some embodiments the stored value may be stored on the memory embedded in or on the portable device 140. In other embodiments, the stored value may be stored on a central server computer, without encoding any new information onto the portable device 140. For example, the initial stored value may be sent to the transit server computer 312 of the transit payment system 130. The transit server computer 312 may then simply perform processing based on the stored value without writing new information to the portable device 140.

The stored value may represent any suitable value. In some embodiments, the stored value may be a monetary value. In certain embodiments, the stored value may be any suitable portion of the total preauthorization amount. For instance, if the preauthorization amount is 100 dollars, the stored value may be 20 dollars. As another example, if the preauthorization amount is 20 dollars, the stored value may also be 20 dollars.

In certain embodiments, the stored value may represent a total number of transit trips. For example, the stored value may indicate that the customer 110 may make 10 total transit trips.

In certain embodiments, the hotel, via the hotel management system 120, may additionally set a maximum per period value for the payment application embedded in or on the portable device 140. For example, if the maximum per period value is set to 100 dollars, then the portable device 140 cannot be used to purchase in excess of 100 dollars in transit fare each period. In this way, if the portable device 140 is lost or stolen, the amount of any fraudulent purchases can be limited. A maximum per period value may be set for any suitable period. For instance, a maximum per period value may be set on a daily, hourly, monthly, or yearly basis. The maximum per period value may also be of any suitable value, such as a monetary value or a value representing a number of transit trips. In some embodiments the maximum per period value may be stored on the memory embedded in or on the portable device 140. In other embodiments, the maximum per period value may be stored on a central server computer, without encoding any new information onto the portable device 140. For example, the maximum per period value may be sent to the transit server computer 312 of the transit payment system 130. The transit server computer 312 may then perform processing based on the maximum per period value without writing new information to the portable device 140.

In some embodiments, the hotel, via the hotel management system 120, may reset, change, or update the stored value and/or maximum per period value at a later time. For example, the customer 110 may subsequently request that the stored value be raised so that he or she can make additional transit trips. In response, the hotel, via hotel management system 120, may update the stored value accordingly.

1. Online Activation

In some embodiments, activation of the portable device 140 may be an online process. More specifically, the hotel management system 120 may send an activation request to the processing engine 150. An activation request may include any relevant data including hotel identifiers, portable device identifiers, payment application identifiers, stored values, maximum per period values, transit system identifiers and/or the like. For instance, an activation request may include a multi-byte payment application identifier, such as the 7 byte UID used in MiFare™ based contactless payment systems. The activation request may further be formatted to the specifications of the application programming interface 340 associated with the processing engine 150 and/or the hotel management system 120. For example, the activation request may be required to be formatted in extensible markup language (XML).

Upon receiving the activation request, a processor (which executes code on a computer readable medium) in the server computer 332 of the processing engine 150 may begin a process of activating the portable device 140 for use with a transit system.

In some embodiments, the server computer 332 may associate the portable device 140 with the requesting hotel based on the data included in the activation request. For example, the server computer 332 may associate identification data for the portable device 140 (e.g., identifier for the portable device 140 and/or identifier for a payment application embedded in or on portable device 140) with the requesting hotel. In other embodiments, an association between the portable device 140 and the requesting hotel may have been previously established. For example, an association may have been established if the portable device 140 was preregistered with the processing engine 150 at an earlier time.

In some embodiments, the server computer 332 may additionally identify a transit system for which the portable device 140 is to be activated. In some embodiments, the server computer 332 may identify the transit system based on the data included in the activation request. For instance, the server computer 332 may determine, based on a transit system identifier, that the portable device 140 is to be activated for use with a local subway system. The processing engine 150 may subsequently send relevant data to a transit payment system (e.g., transit payment system 130) associated with the subway system so that the portable device 140 can be activated for purchasing transit fare. The sent data may be formatted to the specifications of the application programming interface 320 associated with the processing engine 150 and/or the transit payment system 130. For example, the data may be required to be formatted in XML.

In some embodiments, the server computer 332 may store the data associated with the activation of the portable device 140 in database 334. For example, the server computer 332 may cause the database 334 to store a record including data associating the portable device 140 with a transit system and a hotel.

2. Offline Activation

In certain embodiments, activation may occur in an offline manner. In particular, the hotel management system 120 may activate the portable device 140 without communicating with the processing engine 150. For example, the hotel management system 120 may set an activation value for a payment application embedded in or on the portable device 140. The activation value may indicate that the payment application is currently active, and that the portable device 140 may be used to purchase transit fare.

After activation of the portable device 140 (either online or offline), the customer 110 may use the portable device 140 to purchase transit fare and access a transit system.

In some embodiments, the portable device 140 may additionally include other applications for other non-hotel services and transit operators. In some embodiments, multiple applications may be active at the same time. For example, the portable device 140 may include a payment application for a local subway system and another payment application for a local bus system. Both payment applications may be active at the same time so that the customer 110 can use the portable device 140 can be activated for purchasing fare for both the subway and bus systems.

B. Purchasing Transit Fare Using a Portable Device

In certain embodiments, the portable device payment processing system 100 may enable the customer 110 to purchase transit fare using the portable device 140. In some embodiments, the purchase of transit fare may include a first data transfer and first validation, a second data transfer and second validation, and a calculation of a transit fare amount.

1. Entering a Transit System

In a typical scenario, the customer 110 presents portable device 140 to the first access control device 304 of the transit payment system 130 prior to entering a transit system (step 404 of FIG. 4). The first access control device 304 may be situated at the entrance gate 314 of the transit system. The portable device 140 may be presented to the first access control device 304 by being swiped, waved, passed nearby, momentarily placed in contact with (e.g., tapped against), or simply placed in close proximity to the first access control device 304. Presenting the portable device 140 to the first access control device 304 initiates a first data transfer between the portable device 140 and the first access control device 304. For example, presenting the portable device 140 may cause a proprietary contactless payment application embedded in or on the portable device 140 to initiate a data transfer via a near field communications technology. More specifically, the contactless payment application may use a contactless element to initiate the data transfer. In some embodiments, data may be sent by the portable device 140 and received by the first access control device 304 (step 406 of FIG. 4). Data received from the portable device 140 may include a unique identifier for the payment application embedded in or on the portable device 140, a unique identifier for the portable device 140, a unique identifier for the hotel associated with the portable device 140, a current stored value, a maximum per period value, and/or the like. Data received from the portable device 140 may further include authentication information. Authentication information may include, for example, certain bits of information such as encrypted authentication keys.

In certain embodiments, the transfer of data between the portable device 140 and the first access control device 304 may initiate a validation process (step 408 of FIG. 4). In some embodiments, the validation process may be an offline process that is performed by the transit payment system 130. For example, validation may be performed by the first access control device 304 or the transit sever computer 312 of the transit payment system 130. In other embodiments, the validation process may be an online process in which data received from the portable device 140 is sent to the server computer 332 of the processing engine 150. The server computer 332 may then validate the portable device 140 based on the received data.

During validation, the portable device 140 may be authenticated. In some embodiments, authentication may include determining whether the portable device 140 is genuine or authentic. For example, in certain embodiments, the first access control device 304 may check that some characteristic of the portable device 140 (such as an encrypted authentication key) has a desired value or is present. Authentication may further involve determining whether the portable device 140 is on a blacklist (i.e. not acceptable to use for purchasing transit fare). For example, the portable device 140 may currently be on a blacklist because the customer 110 did not previously activate the portable device. As another example, the portable device 140 may have been stolen or lost, and thereafter placed on a blacklist to prevent fraudulent transit transactions.

In certain embodiments, validation may further include determining whether the stored value for the payment application embedded in or on the portable device 140 is equal to or greater than a threshold value. In some embodiments, the threshold value may represent the minimum cost of a trip on the transit system. For example, if the minimum cost of transit fare is 3 dollars, the threshold value may accordingly be set to 3 dollars. Thus, if the portable device 140 only has a stored value of 2 dollars, the portable device 140 is considered not to be valid. In certain embodiments, the threshold value may represent the maximum cost of a trip on the transit system.

In other embodiments, validation may include determining whether the stored value for the payment application embedded in or on the portable device 140 is a number greater than zero. In particular, the stored value may represent a number of remaining transit trips. In such embodiments, a stored value greater than zero would indicate that the portable device 140 can be used to purchase transit fare.

In certain embodiments, validation may further include determining whether the portable device 140 has been used to make fare or ride purchases in excess of a maximum per period value. For example, the payment application embedded in or on portable device 140 may be limited to 100 dollars of purchases per day. During validation, the first access control device 304 may determine that the portable device 140 has been used to purchase in excess of 100 dollars in fare. As a result, the portable device 140 is not validated. As a second example, the portable device 140 may be limited to 10 transit trips per day. During validation, the first access control device 304 may determine that the portable device 140 has already been used to purchase 10 rides for the day. As a result, the portable device 140 is not validated. In some embodiments, information providing a fare purchase history or aggregate purchase value may be used to compare against the maximum per period value. For example, a purchase history may be accessed from a central server computer (such as the transit server computer 312) to determine the value of fare purchases made using the portable device 140 for a given period ending at the time of validation. As another example an aggregate purchase value may be received from the portable device 140 to determine the aggregate value of fare purchases made using the portable device 140 for a given period ending at the time of validation.

In certain embodiments, the stored and maximum per period values may be provided, as discussed above, by the data received from the portable device 140. In other embodiments the stored and maximum per period values may be accessed from a central server computer, such as the transit server computer 312. For example, based on the portable device's 140 identifier and/or payment application identifier, the stored and maximum per period values may be retrieved by the transit server computer 312.

If validation of the portable device 140 is unsuccessful, the customer 110 is denied access to the transit system and may be advised to request assistance in resolving the problem from a representative of the transit system. If validation of the portable device 140 is successful, the customer 110 is permitted to access the transit system (step 410 of FIG. 4). In some embodiments, the first access control device 304 communicates with the transit server computer 312 to inform the transit server computer that the portable device 140 has entered the transit system. In particular, the first access control device 304 may provide, to the transit server computer 312, an identifier for the portable device 140 and/or an identifier for the payment application embedded in or on the portable device 140.

After entering the transit system, the customer 110 may begin using the system, such as by boarding a transit vehicle (e.g., a bus, train, trolley, ferry, and/or the like) (step 412 of FIG. 4).

2. Exiting a Transit System

At step 414, the customer 110 completes his or her use of the transit system and prepares to exit the system by presenting the portable device 140 to the second access control device 308 of the transit payment system 130. The second access control device 308 may be situated at an exit of the transit system. As was the case upon entry to the transit system, the portable device 140 may be presented to the second access control device 308 by being swiped, waved, passed nearby, momentarily placed in contact with (e.g., tapped against), or simply placed in close proximity to the second access control device 308. Presenting the portable device 140 to the second access control device 308 initiates a second data transfer between the portable device 140 and the second access control device 308. In particular, the second access control device 308 may receive data from the portable device 140 (step 416 of FIG. 4).

After receiving data from the portable device 140, the second access control device 308 may perform a second validation operation (step 418 of FIG. 4). This is done to ensure that portable device 140 is still valid (e.g., it has not been deactivated because of being reported stolen, suspected of being fraudulent, and/or the like). In some embodiments, the second validation process may be an offline process that is performed by transit payment system 130. In particular, validation may be performed by the second access control device 308 or the transit sever computer 312 of the transit payment system 130. In other embodiments, the second validation process may be an online process in which data received from the portable device 140 is sent to the server computer 332 of the processing engine 150. The server computer 332 may then validate the portable device 140 based on the data.

If validation of the portable device 140 is unsuccessful, the customer 110 is not permitted to exit the transit system and may be advised to request assistance in resolving the problem from a representative of the transit system. If validation of the portable device 140 is successful, the customer 110 is permitted to exit the transit system (step 420 of FIG. 4).

3. Transit Fare Determination

In certain embodiments, the presentation of the portable device 140 to the second access control device 308 may additionally cause the determination of a fare for the customer's 110 trip (step 422 of FIG. 4). For example, the second access control device 308 may send data received from the portable device 140 to the transit server computer 312. The data may include an identifier for the portable device 140 and/or an identifier for the payment application embedded in or on the portable device 140. Upon receiving the data, the transit server computer 312 may determine the fare for the customer's 110 trip by determining that the identification data provided by the second access control device 308 was first provided by the first access control device 304. Based on the transit system entrance gate 314 and transit system exit gate 318, the transit server computer 312 can apply relevant fare schedules, discounts, and the like to calculate a fare amount for the customer's 110 trip.

In some embodiments, the stored value for the payment application embedded in or on portable device 140 may additionally be changed, updated, or reset. For instance, the stored value may currently be 20 dollars. If the calculated transit fare is 5 dollars, the stored value may be reduced to 15 dollars. As another example, the stored value may currently indicate 5 remaining transit trips. Upon exiting the transit system, the stored value may be changed to indicate 4 remaining transit trips. In some embodiments, an updated stored value may be written to the memory embedded in or on the portable device 140. In other embodiments, an updated stored value may be recorded by a central server computer, such as the transit server computer 312. As a result, the updated stored value may not be written to the memory embedded in or on the portable device 140.

Upon determination of a transit fare, the transit payment system 130 may send transit transaction data to the processing engine 150. In certain embodiments, the transit payment system 130 may save or log the transit transaction.

C. Transit Transaction Data Processing

In some embodiments, the portable device payment processing system 100 may process the transit transaction data. In certain embodiments, the processing engine 150 may perform processing of the transit transaction data. Processing may include receiving the transit transaction data. Processing may further include determining a hotel based on the transit transaction data and sending the transit transaction data (or a portion of the transit transaction data) to a hotel management system associated with the hotel.

1. Receiving Transit Transaction Data

At step 424, the processing engine 150 receives transit transaction data for the customer's 110 transit trip from the processing engine 150. In some embodiments, the processing engine 150 may receive transit transaction data in substantially real-time to the time the customer 110 presents the portable device 140 to the second access control device 308. In other embodiments, the processing engine 150 may receive the transit transaction data in a batch file at a later time. The transit transaction data may include any relevant data for placing a transit charge onto the folio 122 of the customer 110. For example, the transit transaction data may include the total fare amount for the customer's 110 transit trip. The transit transaction data may further include data received from the portable device 140. Data received from the portable device 140 may include an identifier for the payment application embedded in or on the portable device 140, an identifier for the portable device 140, an identifier for the transit payment system 130, an identifier for an associated hotel, and the like. The transit transaction data may further be received according to the specifications of the application programming interface 320 associated with the processing engine 150 and/or the transit payment system 130. For example, the application programming interface 320 may require that any data received by the processing engine 130 from the transit payment system 130 be formatted in XML.

2. Determining A Hotel

After receiving the transit transaction data, the processing engine 150 may determine a hotel based on the transit transaction data (step 426 of FIG. 4). The processing engine 150 may determine a hotel through any suitable manner. For instance, in some embodiments, a processor (which executes code on a computer readable medium) in the server computer 332 may access the database 334 to determine a hotel associated with the identification data for the portable device 140 (e.g., portable device identifier and/or payment application identifier) included in the transit transaction data. Illustratively, the server computer 332 may locate a record stored in the database 334 with a value matching a payment application identifier provided by the transit transaction data. The located record may include a hotel identifier for a hotel associated with the payment application identifier. In certain embodiments, the transit transaction data may already include a hotel identifier. As a result, determining a hotel through accessing the database 334 may not be necessary. The hotel identifier may be in any suitable format and of any suitable value. For example, the hotel identifier may be a unique numerical code that can be used to identify a hotel. As another example, the hotel identifier may be an internet protocol address that corresponds to the internet protocol address of a hotel management system associated with a hotel.

3. Additional Processing

In some embodiments, the server computer 332 may additionally calculate any commissions that might apply based on the transit transaction data. For example, a commission may be calculated based on the identified hotel. More specifically, the server computer 332 may calculate a commission for the hotel using a preset commission percentage associated with the hotel. The commission may be based on any suitable commission percentage or fixed amount.

In some embodiments, the server computer 332 may further save, log, or record the transaction in database 334 in order support and/or provide related services. For example, transaction data may be used to track and reconcile the total fee income generated for all entities (e.g., hotels and transit systems). Such tracking and reconciling may be further used to facilitate billing and reporting functions.

4. Sending the Transit Transaction Data to a Hotel Management System Associated with a Hotel The processing engine 150 may additionally send the transit transaction data (or a portion of the transit transaction data) to the hotel management system (i.e., the hotel management system 120) of the hotel associated with the portable device 140 (step 428 of FIG. 4). The data may be sent according to the specifications of the application programming interface 340 associated with the processing engine 150 and/or the hotel management system 120. For example, the application programming interface 340 may require that any data sent from the processing engine 150 to the hotel management system 120 be formatted in XML.

Figure 5:
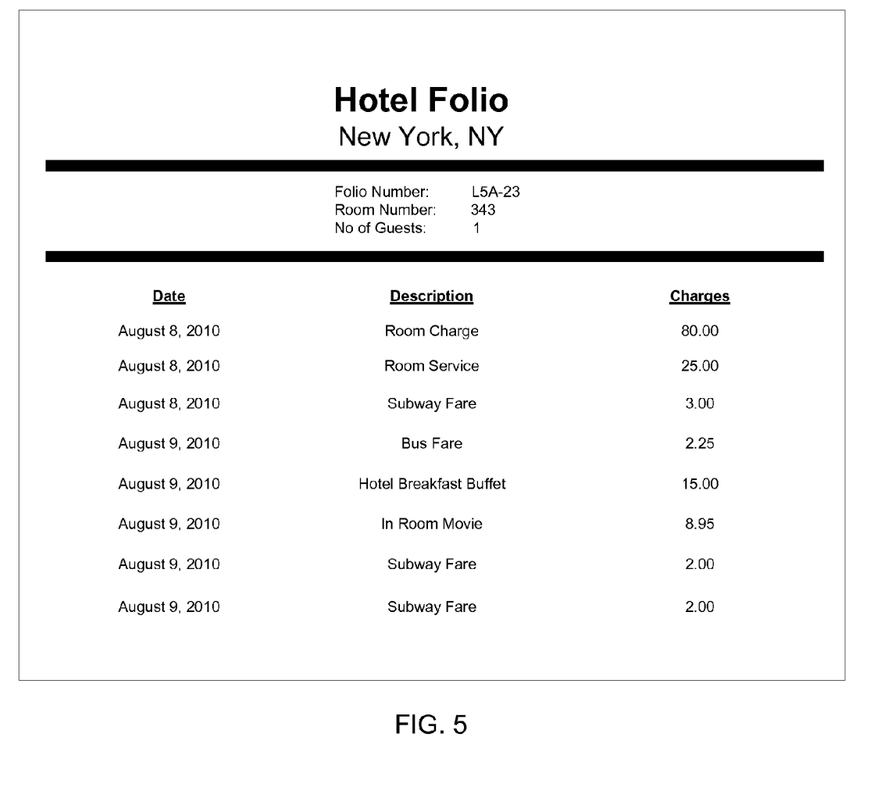
FIG. 5 is an exemplary hotel folio including itemized charges for hotel services and transit fare.

Upon receiving the data from the processing engine 150, the hotel management system 120 may automatically determine a customer's folio (i.e. the customer's folio 122) on which a transit charge is to be placed (step 430 of FIG. 4). The hotel management system 120, for example, may determine, based on identification data (e.g., portable device identifier and/or payment application identifier) included in the data provided by the processing engine 150, that the portable device 140 is currently assigned to the customer 110. As a result, the hotel management system 120 may place a transit charge onto the folio 122 of the customer 110 (step 432 of FIG. 4). FIG. 5 shows an exemplary hotel folio according to embodiments of the present invention. The folio shown in FIG. 5 includes charges for hotel purchases (e.g., room service, in room movie) and transit fare purchases (e.g., subway and hotel fare).

At or after the end of the customer's 110 stay, the customer 110 may initiate a check-out process. During the check-out process, the customer 110 may settle both his or her hotel related charges (such as hotel restaurant bills, room service charges and the like) and transit charges at the same time (step 434 of FIG. 4). The customer 110 may settle his or her charges using any suitable method. For example, the customer 110 may settle his or her charges with cash. As another example, the customer 110 may settle his or her charges with the customer payment card 112. In particular, the customer 110 may provide the customer payment card 112 to the hotel. Upon being provided with the customer payment card 112, the hotel may send an authorization request message to an acquirer (e.g., bank) associated with the hotel. The authorization request message may be sent by a POS terminal operated by the hotel. In such cases, the authorization request message may contain information, such as an expiration data for the customer payment card 112, a CVV or card verification value, an account number including a bank identification number, a service code, and a merchant category code. If the hotel previously placed a preauthorization hold on the account associated with the customer payment card 112, the authorization request message may additionally indicate that the preauthorization hold be converted. Upon receiving the authorization request message, the acquirer may in turn send the authorization request message to a payment processing network, such as VisaNet™. The payment processing network may then forward the authorization request message to the issuer (e.g., bank) of the customer payment card 112. After the issuer receives the authorization request message, the issuer sends an authorization response message back to the payment processing network to indicate whether or not the current transaction is authorized. The payment processing network then forwards the authorization response message to the hotel via the hotel's acquirer. The hotel subsequently receives the authorization response message at a POS terminal operated by the hotel.

In some embodiments, because the hotel management system 120 obtains both payment card information, hotel related purchase information, and transit fare purchase information, the hotel or any suitable third party may combine the loyalty points or rewards associated with any of these purchases in any suitable manner to provide benefits. For example, in some embodiments, the hotel may provide loyalty points for transit purchases and also for use of a particular payment card. Such points may be greater than what would be accrued if purchases were made separately. By allowing a hotel guest to combine points, the hotel may encourage their guests to purchase transit system fare using a hotel assigned portable device.

D. Transit Fare Payment

In certain embodiments, funds may be transferred among various entities in order to pay for the customer's 110 transit trip.

In certain embodiments, the processing engine 150 may initiate a first transfer of funds to the transit system in order to pay for the customer's 110 transit fare. In some embodiments, the funds may be transferred from an account associated with the operator of the processing engine 150. The hotel may thereafter initiate a transfer of funds for the amount of the transit fare to the operator of the processing engine 150. For example, the hotel may initiate the transfer of funds to the operator of the processing engine 150 after the customer 110 has settled his or her hotel folio.

In other embodiments, the hotel may initiate a transfer of funds to pay for the customer's 110 transit fare the transit fare directly to the transit system. For example, the hotel may transfer funds to the transit system after settlement by the customer 110.

The transfer of funds may occur in any suitable manner. For example, the processing engine 150 may initiate a transfer of funds to the transit system via an original credit transfer. As another example, the hotel may directly send a check to the transit system for the transit fare amount. Fund transfer may further occur at any suitable time. For example, the transfer of funds may occur during a customer's transit ride, at the time the customer exits the transit system, at the time the customer settles his or her hotel folio, or any time period thereafter.

The various participants and elements described herein with reference to FIGS. 1 and 3 may operate one or more computer apparatuses to facilitate the functions described herein. Any of the elements in FIGS. 1 and 3, including any servers or databases, may use any suitable number of subsystems to facilitate the functions described herein.

Figure 6:
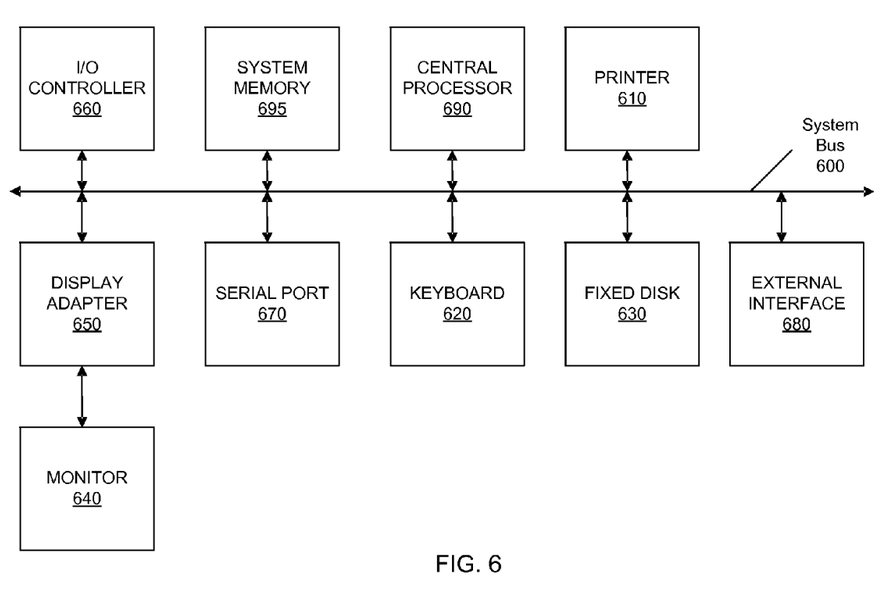
FIG. 6 is a block diagram of elements that may be present in a computing device or system programmed to implement a method or process for activating a portable device, purchasing transit fare, processing transit transaction data and placing a transit charge onto a hotel folio, in accordance with embodiments of the present invention.

Examples of such subsystems or components are shown in FIG. 6. The subsystems shown in FIG. 6 are interconnected via a system bus 600. Additional subsystems such as a printer 610, keyboard 620, fixed disk 630 (or other memory comprising computer readable media), monitor 640, which is coupled to display adapter 650, and others are shown. Peripherals and input/output (I/O) devices, which couple to I/O controller 660 (which can be a processor or other suitable controller), can be connected to the computer system by any number of means known in the art, such as serial port 670. For example, serial port 670 or external interface 680 can be used to connect the computer apparatus to a wide area network such as the Internet, a mouse input device, or a scanner. The interconnection via system bus allows the central processor 690 to communicate with each subsystem and to control the execution of instructions from system memory 695 or the fixed disk 630, as well as the exchange of information between subsystems. The system memory 695 and/or the fixed disk 630 may embody a computer readable medium.

Embodiments of the invention are not limited to the above-described embodiments. For example, although separate functional blocks are shown for hotel management systems, a processing engine, and transit payment systems, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, data processing, validation, activation, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A portable device payment processing system comprising:
   a database; and
   a server computer coupled to the database, wherein the server computer comprises a processor and a computer-readable storage medium coupled to the processor, the computer-readable storage medium comprising code executable by the processor for implementing a method comprising:
      receiving transaction data at the server computer from a transit payment system, wherein the transaction data is transit transaction data, the transit transaction data including an identifier of the transit payment system and a payment application identifier of a payment application, and wherein the payment application is embedded in a portable device involved in a transaction with the transit payment system;
      determining, by the server computer, a hotel based on the payment application identifier in the transaction data; and
      sending, by the server computer, the transaction data to a hotel management system associated with the hotel, wherein the hotel management system places a charge based on the transaction data onto a hotel folio.

2. The system of claim 1, wherein the transaction data includes data received from the payment application.

3. The system of claim 1, wherein the transaction with the transit payment system is conducted using the payment application.

4. The system of claim 1, wherein the method further comprises:
   receiving, from the hotel management system, an activation request to activate the portable device for use with the transit payment system, wherein the activation request includes the payment application identifier; and
   processing the activation request, wherein processing the activation request includes storing information indicating an association between the portable device and a hotel identifier of the hotel corresponding to the hotel management system, and wherein the stored information includes the payment application identifier.

5. The system of claim 1, wherein the portable device further includes a hotel room key application.

6. The system of claim 5, wherein the hotel room key application is configured to communicate with an access control device to access a hotel room.

7. The system of claim 1, wherein the portable device is configured by the hotel management system, and wherein the portable device is configured with a threshold monetary value for use with the transit payment system.

8. The system of claim 1, wherein the payment application is configured by the hotel management system, and wherein the portable device is configured with a value corresponding to an amount of transit trips for use with a transit system corresponding to the transit payment system.

9. A method comprising:
   receiving transaction data at a server computer from a transit payment system, wherein the transaction data includes transit transaction data, the transit transaction data including an identifier of the transit payment system and a payment application identifier of a payment application, and wherein the payment application is embedded in a portable device involved in a transaction with the transit payment system;
   determining, by the server computer, a hotel based on the payment application identifier in the transaction data; and
   sending, by the server computer, the transaction data to a hotel management system associated with the hotel, wherein the hotel management system places a charge based on the transaction data onto a hotel folio.

10. The method of claim 9, further comprising:
    calculating a hotel commission based on the transaction data.

11. The method of claim 9, further comprising:
    receiving, from the hotel management system, an activation request to activate the portable device for use with the transit payment system, wherein the activation request includes the payment application identifier; and
    processing the activation request, wherein processing the activation request includes storing information indicating an association between the portable device and a hotel identifier of the hotel corresponding to the hotel management system, and wherein the stored information includes the payment application identifier.

12. The method of claim 11, further comprising:
    sending, to the transit payment system, a request to activate the portable device for use with the transit payment system; and
    sending, to the hotel management system, an authentication response indicating an result of the activation request.

13. The method of claim 9, wherein the transaction data includes data received from the payment application embedded in the portable device.

14. The method of claim 9, wherein the transaction data is received according to a format of a first application programming interface.

15. The method of claim 14, wherein the received transaction data is sent to the hotel management system according to a format of a second application programming interface.

16. The method of claim 9, wherein the hotel folio includes charges for transit fare purchases associated with a transit system.

17. The method of claim 16, wherein the hotel management system initiates a transfer of funds to pay for the transit fare purchases to the transit system.

18. The method of claim 9, wherein the server computer is included in a payment processing network.

19. The method of claim 9, wherein the transit payment system is associated with a transit transportation system, and wherein the payment application is configured for use with the transit payment system.

20. The method of claim 9, wherein the portable device includes a plurality of payment applications, and wherein each payment application of the plurality of payment applications is associated with a distinct payment application identifier and is configured to conduct transactions with a particular transit payment system of a distinct transit system.

* * * * *